Jan. 21, 1969     E. W. WEITZEL     3,422,874
TIRE AND METHOD OF MAKING IT BY APPLYING STRIP OF RUBBER
COATED CONTINUOUS TIRE CORD OF LOW EXTENSIBILITY TO
THE CARCASS IN FLAT FORM AND SIMULTANEOUSLY
SHAPING AND VULCANIZING TO
FINAL TIRE SHAPE
Filed Oct. 18, 1965     Sheet  1  of 2
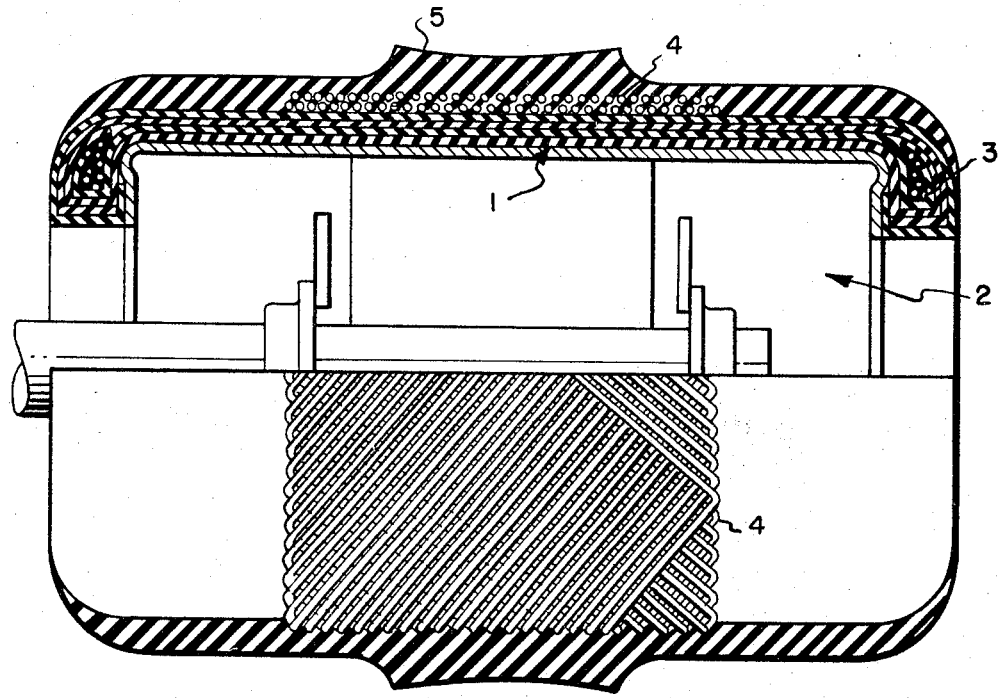
FIG.-1-
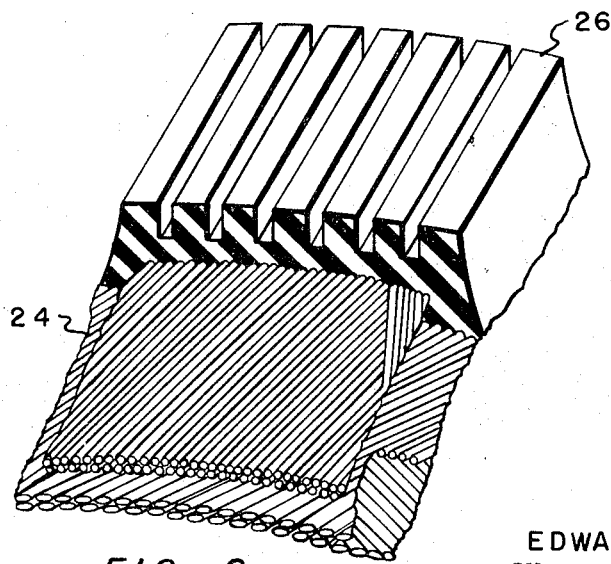
FIG.-2-
INVENTOR.
EDWARD W. WEITZEL
BY
ATTORNEY

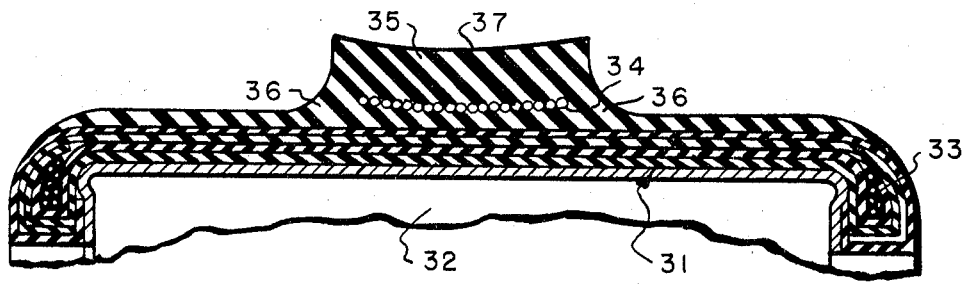
FIG. -3-
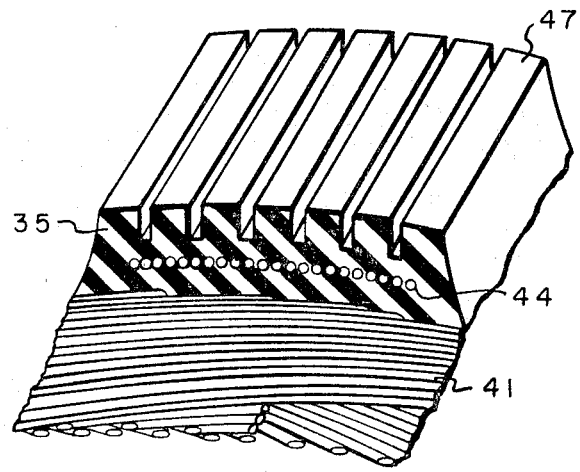
FIG. -4-
*INVENTOR.*
EDWARD W. WEITZEL
BY
ATTORNEY

United States Patent Office 3,422,874
Patented Jan. 21, 1969

3,422,874
TIRE AND METHOD OF MAKING IT BY APPLYING STRIP OF RUBBER COATED CONTINUOUS TIRE CORD OF LOW EXTENSIBILITY TO THE CARCASS IN FLAT FORM AND SIMULTANEOUSLY SHAPING AND VULCANIZING TO FINAL TIRE SHAPE
Edward W. Weitzel, Greenville, S.C., assignor to Deering Milliken Research Corporation, Spartanburg, S.C., a corporation of Delaware
Filed Oct. 18, 1965, Ser. No. 497,253
U.S. Cl. 152—361                     11 Claims
Int. Cl. B29h 17/14

This invention relates to a process for making pneumatic tires and more specifically to a process for making drum built pneumatic tires.

Radial ply tires are characterized by a carcass or body composed of rubberized plies of radially arranged cords and by a substantially inextensible breaker located between the carcass and the tread, the breaker being composed of at least one band of cords which are substantially parallel and substantially inextensible. For this purpose, the breaker strip or belt is usually constructed of strands of very low elongation and preferably arranged in a manner so as not to exceed an angle value of about 20° to a plane perpendicular to the rotational axis of the tire.

Because of the tensioned condition of the breaker strip and its function as a stricture band, the tread portion of the tire has a substantially flat, ground-contacting area. Due to the construction described, the tread portion of the tire is maintained in a substantially flat condition, and the contraction and expansion of the area of the tread in contact with the ground is greatly minimized.

The standard method of building tires is the so-called "flat band" or "drum building" method in which the plies of rubberized cord fabric constituting the carcass are laid over a flat, drum-like structure, the edges of the plies being wrapped in various methods about the beads, which are located in bead seats on the edges of the drum. The tread is then applied to the central portions of the carcass followed by the addition of sidewalls, chafer strips and other parts of the tire. The drum is collapsed and the tire in "flat band" or "pulley band" form is removed and shaped and cured. This operation is done by bringing the band into substantially tire form and then inserting a curing bag on which the tire is cured in a mold while held under internal pressure or the band is placed in a press in which it is shaped and cured under internal pressure contained in a diphragm located in the press.

This flat building method is universally adopted and used because it is economical. The building of a tire requires no particular skill or aptitude, and the standard tires perform well although they do not have the special attributes of a tire of radial construction.

In the building of radial tires or conventional tires containing breaker belts, it is desirable to utilize many of the beneficial and standardized features of the "flat band" method, but due to the special construction and properties of such breaker belts, which inhibit any substantial expansion of the central part of the carcass, it is impossible to employ existing machines and existing methods.

While extensible breaker belts are known, that is to say breaker belts which lend themselves to use in drum building tire making processes none of these extensible breaker belt members have found acceptance in the preparation of drum built tires and more specifically in the preparation of drum built radial tires. A characteristic example of the extensible breaker belt members of the prior art may be seen in U.S. Patent No. 2,884,044. U.S. Patent No. 2,884,044 discloses a method for providing an extensible breaker belt through the utilization of extensible cord members prepared from winding a tire cord material about a green rubber core. The belt produced from helically wrapped tire cord has the ability to be extended in a vulcanizing operation without the green rubber core interfering in any way, the green rubber core subsequently flowing about the extended cord in the vulcanizing operation. Because of a need for such breaker strips to have limited extensibility, however, the usage of helically wrapped tire cord materials has not found wide acceptance in that it is difficult to properly meter such wrapping operations so as to coincide with a preselected degree of extensibility. The use of an extensible helically wound yarn in the preparation of a tire is also objectionable in that upon extension of a helix to its maximum length, the twist existing in the helix must of necessity be transferred into the plying twist of the yarn. The ply twist of a tire cord yarn is a critical feature in the determination of yarn tensile strength and yarn flex life. Tire cord yarns are usually prepared so that the singles yarns have from 8 to 15 turns per inch in the singles direction and from 8 to 15 turns per inch of ply twist in a direction opposite to that of the singles twist. Any variation in this range, either above or below will seriously diminish either the tensile strength of the yarn or the flex lfe of the yarn. It can, therefore, readily be appreciated that extensibility cannot be achieved by means of helically wrapping an elastomeric core whereby either the tensile strength or flex life of tire cord will be detrimentally affected.

When an extensible breaker strip is employed in the construction of a drum built tire, it should be noted that if the extensible breaker strip is applied immediately adjacent those cords forming the carcass of the tire so that when the drum built cylinder of raw tire is subsequently forced into toroidal form, the central sections of the breaker strip will be forced to expand to a greater degree than those cords which are on the periphery of the breaker strip. As may be seen, it is preferable that the breaker strip have differential degrees of extensibility or that some means be incorporated within the extensible breaker strip for destroying any residual extensibility remaining in the peripheral portions of the breaker strip.

It is therefore an object of this invention to provide a process for the preparation of a drum built pneumatic tire employing a breaker strip in the drum building operation wherein the tensile strength of the tire cords making up the breaker strip are substantially undiminished.

It is an additional object of this invention to provide a process for the preparation of a radial tire cord containing pneumatic tire wherein the tire carcass can be prepared in a single drum building operation without substantially diminishing the tensile strength of any of the cord components employed therein.

It is a further object of this invention to provide an extensible breaker strip which will result in individual cords of low extensibility and substantially undiminished tensile strength and flex life when secured in a final configuration.

It is still another object of this invention to provide a breaker strip of variable extensibility which will result in individual cords of low extensibility when secured in a final configuration.

These and other objects will be more apparent from the following description of the invention.

In accordance with this invention, it has now been discovered that it is possible to prepare a drum built pneumatic tire which may be a radial pneumatic tire by means of a process comprising preparing a plied textile cord carcass on a drum and then superimposing an extensible textile cord breaker band over the drum mounted carcass, the individual cords of said superimposed textile cord material being at substantially less than a 20° angle from the plane of the axis of rotation of the tire. Green rubber may then be superimposed over this structure and the assembly removed from the drum and placed in a mold to assume the final toroidal configuration. It should be understood that the breaker strip may be either a preformed ring or may be a ring which is prepared on the drum itself by means of wrapping a predetermined length of material about the drums so as to form a ring member. It should also be understood that the cords of the breaker band, when in their final configuration are of substantially undiminished tensile strength and flex life.

It is preferred that the breaker band be disposed so as to be parallel with the outer surface of the tire tread portion. In order to achieve this configuration, it is necessary to build a "shoulder" section on the tire casing so as to raise the peripherial portions of the breaker strip to a greater height from the tire carcas than the central portion of the breaker strip. It must be noted that the use of these shoulder members is preferred where the breaker band has not been given a treatment so as to produce a differential degree of expansion in the breaker band or been given a treatment so as to destroy any residual extensibility remaining in the peripherial portions of the breaker band.

A better understanding of the geometry of the tire construction may be had from a discussion of the drawings wherein:

FIGURE 1 is a transverse elevation view with parts shown in section and parts broken away of a raw tire as initially assembled on a tire building drum.

FIGURE 2 is a fragmentary perspective view with parts broken away of a cured tire constructed in accordance with this invention and including a breaker band applied directly over the tire carcass cords.

FIGURE 3 is a transverse elevation view with parts shown in section and parts broken away of a raw tire as initially assembled on a tire building drum, the raw tire containing shoulder portions so as to allow the breaker band to be parallel with the tread portion when the tire is in its final configuration.

FIGURE 4 is a fragmentary perspective view with parts broken away of a cured tire constructed according to this invention and including a circumferential breaker band which is substantially parallel to the exterior plane of the tread portion.

Turning to FIGURE 1 of the drawings, a typical tire cord carcass assembly 1 is built up in the form of a flat band by superimposing successive plies of rubberized tire fabric on the building surface of a tire building drum 2 with the usual bead members 3 contained in the overlapped marginal edge portions of the plies. Thereafter, the extensible breaker strip member 4 is wound around the central outer surface of the carcass. The extensible breaker strip member 4 is prepared from cord precision wound on a green rubber band so that the cord in reversing the direction of its traverse produces a plurality of angles of about 40°. Subsequently, a raw rubber tread and side wall body 5 is superimposed on the assembly to provide the exterior rubber covering of the tire.

The thus assembled raw tire in cylindrical form is then removed from the tire building drum and is shaped and vulcanized in the form of a torus under heat and pressure in a tire mold thereby providing the completed tire as shown in FIGURE 2. As may be seen in FIGURE 2, the breaker strip member 24 has now been extended and the individual cords making up the breaker strip are now disposed in a manner so as to form a plurality of angles of about 20° while the width of breaker band member 24 has been reduced by about 50%. It should also be noted that breaker band member 24 does not follow a plane which is parallel with the plane of the outer surface of the tread portion 26, this configuration being indicative of the fact that the central section of breaker strip member 24 has been extended to a greater degree than the peripheral portions of the breaker strip member. For this reason the central cords of breaker strip member 24 must undergo a greater degree of extensibility than the cords on the periphery of breaker strip 24.

As the area of tread which is in moving contact with the road surface is subjected to wear due to the drag which accompanies movement in the lateral direction as well as movement in either the forward or the reverse direction, a tire which contains a belt member experiences a substantial reduction in wear due to the rigidity which the belt furnishes and thereby minimizing the drag that accompanies the forward and reverse movement. The rigidity of such a belt member, however, is reduced if the belt member is not in the same plane as the plane of the exterior surface of the tread. It should also be noted that if the belt member employed in this invention has a uniform degree of extensibility, that is to say if the central section of the belt member has the same degree of extensibility as the peripheral portions of the belt member, it is essential that the belt member be in the same plane as the plane of the exterior portion of the tread, otherwise residual stretch will remain in the peripheral portion and result in uneven tensions within the belt member. While residual stretch can often be removed by employing chemically elasticized belt members or by employing various mechanical compensators, it is frequently desired to build a shoulder portion into the green rubber tire and thereby provide equidistant planes between the belt member and the outer surface of the tread portion. A better understanding of this configuration may be had from FIGURE 3 of the drawings.

In FIGURE 3 of the drawings it may be seen that a tire carcass 31 is disposed as usual on a tire building drum 32, the edge portions of the carcass being wrapped about bead members 33. Breaker band member 34, however, instead of being superimposed directly upon carcass 31 is mounted within the green rubber 35, green rubber 35 having a shoulder portion 36 disposed between the peripheral portion of breaker band 34 and the outer layer of carcass 31. The function of the shoulder portions 36 is to cause breaker band member 34 to be positioned equidistant from the tread forming surface 37. The equidistant positioning of the breaker band is more readily apparent in the view seen in FIGURE 4 of the drawings. In FIGURE 4 the radial disposition of the plys composing the carcass 41 may be seen. The breaker strip 44 which is positioned within the vulcanized rubber portion 35 is clearly equidistant at all points from the outer surface of the tread portion 47. In addition to providing greater wear life in the final product, this type of positioning provides a more uniform degree of expansion for the breaker band in the transition from the cylindrical form in the green tire to the toroidal form of the final product.

The extensibility of the breaker belt may be achieved by mechanical means, chemical means or combined chemical and mechanical means. While any number of a wide variety of procedures may be employed for obtaining the aforementioned desired result, the following specific mechanical means have been found to be especially suitable for purposes of this invention, the mechanical means being as follows:

Knit fabric wherein the low modulus elongation of knit fabrics for the required low modulus expansion of the breaker belt, either in circular form or flat woven is utilized.

Textured yarn wherein the low modulus elongation of textured yarn for the required low modulus expansion of the breaker, either in a tubular woven form or flat woven is utilized. The term textured yarn as employed herein is meant to include thermoplastic yarns which are elasticized by mechanically or thermo-mechanically disposing a crimp or spiral configuration on the yarn.

Bias fabric wherein the low modulus elongation of a bias fabric for the required low modulus expansion of the breaker belt in a tubular braided form is utilized.

Precision cord wound green rubber belts wherein the low modulus elongation of the angle of the wind is utilized.

Gathered fabric wherein the required extensibility of the breaker belt is developed by gathering the fabric by sewing so that the sewing thread will break and release the gathered areas during the expansion cycle. The fabric may be in either tubular form or flat.

Tufting tire cord in a stretchable material (green rubber stock) to develop the required extensibility of the breaker belt. The fabric may be in either circular or flat form.

One could also use the textured yarn as a low modulus elongation cord that could be wound on the green tire drum during the building operation.

When the low modulus elongation breaker belt is achieved by means of a chemical treatment of a textile material, it is preferred that the chemical treatment be a treatment of the type which temporarily changes the crystalline characteristics of the textile fiber to an amorphous form so that elongation characteristics can be achieved and then subsequently destroyed by reverting the amorphous form back to the crystalline form. Among the preferred textile materials which may be employed in achieving this result are cellulosic materials such as, for instance regenerated cellulose and polyester materials such as, for instance, polyethylene terephthalate.

The chemically elasticized cellulosic material may be conveniently prepared by means of exposing the cellulosic material while in relaxed state to the action of liquid ammonia. The liquid ammonia is preferably maintained at a temperature of from about −60° C. to below about −32° C. the exposure time being for an interval of from about 1 second to about 5 minutes. The liquid ammonia immersion operation is preferably followed by drying operation wherein exposure to moisture is minimized. Minimal moisture exposure is obtained by rapid drying in normal atmospheres in a drying oven such as, for instance, a Fleisner drier or by drying at room temperatures under substantially moisture free conditions. The cellulosic material undergoes a change by means of this treatment wherein substantial portions of the cellulosic molecule are converted from a crystalline configuration to an amorphous configuration, the change being readily apparent from a viewing of the X-ray defractogram before and after liquid ammonia treatment. The amorphous structure of the cellulosic molecule has been found to be more amenable to conforming to stretching operations than the crystalline structure. The amorphous structure is also a structure which may be readily reconverted to the initial crystalline structure. The reversion to the crystalline structure may be conveniently affected by the application of temperatures in the range commonly employed in vulcanizing a tire. This reversion results in the permanent setting of the cellulosic material to that configuration to which it has conformed itself while in the amorphous state.

While the cellulosic material thus treated may be maintained in an amorphous structure for substantial periods of time at temperatures at 25° or less it is preferred to increase the ability of the amorphous structure by impregnation with the bond inhibitor. In general, the bond inhibitors fall into two groups which are liquid ammonia compatible polymers and liquid ammonia compatible plasticizers. The bond inhibitor may be employed by simply dissolving the inhibitor in the liquid ammonia treatment bath. Inhibitors which are effective in accordance with this invention are compounds capable of interfering with or substantially preventing the formation of hydrogen bonds between adjacent molecular chains of cellulose. The polyhydric alcohol containing 2 to 6 carbon atoms or mixtures thereof have been found to be especially effective and preferably use is made of dihydric and trihydric alcohols exemplified by polyethylene glycol, polypropylene glycol, glycerine, diethyltoluene, triethyltoluene, trimethylene glycol, butane diols such as tetramethylene glycol, butane triol, pentane triol, diethylene glycol, dipropylene glycol and triethylene glycol.

Polymeric materials which are suitable for use as inhibitors are any of the polymeric materials which are soluble in liquid ammonia as well as any of the polymeric materials which are soluble in an organic solvent which is soluble in liquid ammonia. The term "polymeric material" as employed herein includes monomeric materials, which may be cured in situ to a polymer. Polymeric materials which have been found to be especially suitable for purposes of this invention are phenol formaldehyde, melamine formaldehyde, urea formaldehyde, dimethyl ethylene urea, dihydroxy dimethyl ethylene urea, polyvinyl alcohol, polyethylene glycol, polyacrylic acid, polyvinyl acetate, the sodium salt of styrene maleic anhydride copolymer and any liquid ammonia soluble isocyanate containing polymer. It should also be noted that many of the components which are commonly employed as tire cord tackifying ingredients may also be incorporated at the time of a liquid ammonia treatment.

Extensible breaker bands where extensibility is achieved by chemical treatment may be prepared from fabrics other than cellulosic fabrics. Breaker bands composed of polyester continuous filaments have been found to be especially suitable. The elongation characteristics of the polyester yarn is achieved by a solvent-induced shrinking treatment, whereby a recoverable contraction is produced within the yarn. The solvent-induced yarn contraction is achieved by means of shrinking oriented crystalline polyester yarns with a halogenated methane solvent such as, for instance, partially halogenated methanes selected from the group consisting of methylene chloride, chloroform, monochloromethane, chlorobromomethane, chloroiodomethane, tribromomethane, dibromomethane, and the like. Procedures which may be employed in treating the polyester breaker belts so as to effect extensibility are disclosed in U.S. Patent No. 2,981,978. The patented procedure involves the treatment of a fabric at room temperature in baths such as chloroform baths, at moderately elevated temperatures or in baths comprising emulsions of methylene chloride and water or 100% methylene chloride.

It should be understood that while regenerated cellulose and polyester continuous filaments are preferred for purposes of this invention when elasticization via chemical treatments is to be carried out that other synthetic fibers may also be employed, such as, for instance, polyamides may be employed, polyamides being rendered elastic by means of a treatment with an organic solvent.

The following specific examples for the preparation of the extensible breaker belt of this invention are given for purposes of illustration and should not be considered as limiting the spirit or scope of this invention.

EXAMPLE I

A two ply, 1650 denier high strength rayon yarn having 8 turns S twist in the singles and 8 turns Z twist in the ply is wound by means of a Model 77 Foster winding machine manufactured by the Foster Machine Company of Westfield, Mass., onto a drum mounted green rubber belt which is 16 inches in diameter. The traversing mechanism of the Foster winding machine is adjusted so as to lay yarn across the width of the belt 8 times for each revolution of the green rubber belt. When 128 lays of yarn have been placed upon the green rubber belt, the winding is stopped and the product is found to have yarn disposed at an angle of 36° from the bias. The term lay as used herein is meant to define that quantity of yarn disposed by one stroke of the traversing mechanism in either direction. While the yarn may be laid directly upon the band of green rubber material, it is preferred that the yarn be first kiss coated with the following coating compositions:

| | Parts |
|---|---|
| Natural rubber latex (62% by weight aqueous solution) | 100 |
| Pentalyn A (pentaerythritol esters of rosin marketed by Hercules Powder Company) | 50 |

The resultant product may be secured to the tire building drum which already contains components of the tire carcass as a preformed ring member or may be wound upon the drum in strip form so as to produce a breaker belt.

EXAMPLE II

A rayon fabric prepared from 2 ply 1650 denier rayon continuous filament warp yarns and single 30's spun rayon fill yarns being 54 inches wide and having 14 ends per inch and 2.5 picks per inch is immersed in a liquid ammonia bath. The liquid ammonia bath is maintained at approximately −33° C. and the fabric is subjected to an immersion time in this bath for about 2 minutes. The treated fabric is then removed from the bath and passed through a Fleisner drier at the rate of about 1 yard per minute, the rate subjecting the fabric to a total drying time of from 4½ minutes to about 5 minutes. The fabric is then kiss coated while in a relaxed state with the composition set forth in Example I. The fabric is then cut along the direction of the warp yarns and secured to the tire building drum which has previously had a tire carcass built thereon. Green rubber may then be secured to the entire assembly so as to form side wall and tread portions and the cylindrical structure removed from the tire building drum and reduced to its final toroidal configuration in a final molding operation.

EXAMPLE III

A fabric prepared from 2 ply 1100 denier polyester warp yarns and single 30's spun rayon fill yarns being 54 inches wide and having 18 ends per inch and 5 picks per inch is immersed in a 100% methylene chloride treating bath maintained at a temperature of about 50° C. for a period of about 5 minutes. The treated fabric is then dried and subjected to the coating composition set forth in Example I, the coating operation being carried out by means of a kiss roll while the fabric is in a substantially tensionless condition. The thus tackified fabric may then be employed as a breaker belt substantially in accordance with the process set forth in Example II.

EXAMPLE IV

A fabric prepared from 2 ply 1650 denier rayon warp yarns and single 30's spun rayon filling yarns being 54 inches wide and having 18 ends per inch and 5 picks per inch is seamed with additional single 30's spun rayon yarn so as to produce a ¼ inch pucker extending in the fill yarn direction every ½ inch. The stitch puckered fabric is then subjected to the tackifying bath given in Example I, the tackifying solution being kiss coated upon the puckered fabric while in a substantially tension-free condition. The fabric thus prepared may be cut into strips of suitable width and secured to existing carcass assemblies previously built upon a tire building drum. This assembly is then covered with sufficient green rubber so as to provide for the side wall and tread portions of the tire and the cylinder member is then removed from the drum and placed in a mold wherein the cylinder assumes its final toroidal configuration.

EXAMPLE V

Two ply 1650 denier all rayon multifilament yarn is tufted into a green rubber film in band form. The tufting operation is carried out in a manner such that ¼ inch tufts are produced every inch, the rows of tuft being about 1/20 inch apart. The tire cord tufted green rubber belt is then cut into suitable widths which are then secured on a tire building drum having a tire carcass previously built thereon. It should be understood that the green rubber belt must be of the diameter which is suitable for the tire building drum preselected for a specific tire size. The remainder of the tire building operation may follow any of those procedures which are well known to the art and more specifically those procedures which have been outlined in the foregoing examples.

Two ply 1650 denier all rayon multifilament yarn is treated in a liquid ammonia bath according to the process set forth in Example II. The yarn is then tufted into a green rubber band in film from according to the procedure set forth in Example V. The resultant breaker band product is found to have a high degree of extensibility, residual amounts of which may be eliminated in vulcanizing operations which are conducted as a final step in preparing a tire according to the previously described drum building tire process.

Having thus disclosed the invention, what is claimed is:

1. A method of making a pneumatic tire including the steps of forming a tire carcass in flat band form, applying an extensible breaker strip to said carcass, said breaker strip comprising rubber coated continuous tire cord of low extensibility disposed in a pattern across the width of said strip from one side to the other with reversals at the edges of the strip, applying sidewall and tread-forming green rubber over said carcass and breaker strip assembly in a flat band form of substantially smaller diameter than the final form of said tire, shaping and vulcanizing the assembly in the form of a torus under heat and pressure, and simultaneously substantially increasing the circumference of said breaker strip and significantly reducing the width of said breaker strip, the cord in the final configuration having substantially undiminished tensile strength and flex life.

2. The method of claim 1 wherein said tire cord is arranged in said breaker strip to provide a change in the position thereof within said strip when the circumference of the strip is substantially increased during the shaping step.

3. The method of claim 1 wherein said breaker strip comprises said tire cord in association with a green rubber belt.

4. The method of claim 1 wherein rubber shoulder portions are disposed between the peripheral portions of said breaker strip and said carcass.

5. The method of claim 1 wherein the twist level of said cord is maintained substantially the same before and after the shaping step.

6. The method of claim 1 wherein said cord has been treated chemically.

7. The method of claim 1 wherein said breaker strip comprises cellulosic tire cord subjected to a liquid ammonia treatment.

8. The method of claim 1 wherein said breaker strip comprises polyester tire cord subjected to a halogenated alkane treatment.

9. A method of making a pneumatic tire including the steps of forming a tire carcass in flat band form, applying an extensible breaker strip to said carcass, said breaker strip comprising tire cord tufted into a green rubber belt to form puckers in said cord, applying sidewall and tread-forming green rubber over said carcass and breaker strip assembly in a flat band form of substantially smaller diameter than the final form of said tire, shaping and vulcanizing the assembly in the form of a torus under heat and pressure, and simultaneously substantially increasing the circumference of said breaker strip and substantially removing the puckers in said cord, the cord in the final configuration having substantially undiminished tensile strength and flex life.

10. The method of claim 9 wherein said cord has been treated chemically.

11. A pneumatic tire made according to the method of claim 1.

References Cited

FOREIGN PATENTS 246,620  12/1960  Australia.

EARL M. BERGERT, *Primary Examiner*

C. B. COSBY, *Assistant Examiner.*

U.S. Cl. X.R.

156—110, 123, 126